United States Patent [19]
Gares

[11] Patent Number: 5,957,352
[45] Date of Patent: Sep. 28, 1999

[54] TOOL HOLDING DEVICE DESIGNED TO BE ATTACHED TO A WHEELBARROW

[76] Inventor: Jean-Michel Gares, 2 Quai Magellan, 44000 Nantes, France

[21] Appl. No.: 08/887,946

[22] Filed: Jul. 3, 1997

[30] Foreign Application Priority Data

Jul. 5, 1996 [FR] France .................................. 96 08572

[51] Int. Cl.⁶ ....................................................... B60R 7/00
[52] U.S. Cl. .......................... 224/401; 24/339; 224/545; 224/546; 224/558; 224/564; 224/571; 280/47.19; 280/47.31
[58] Field of Search ..................................... 224/401, 402, 224/403, 405, 441, 482, 560, 571, 404, 442, 410, 545, 546, 558, 564, 565, 324, 96; 280/47.19, 47.31; 211/60.1; 248/68.1, 231.81; 24/339, 555, 545

[56] References Cited

U.S. PATENT DOCUMENTS

| | | |
|---|---|---|
| 2,570,504 | 10/1951 | Van House . |
| 4,923,202 | 5/1990 | Breveglieri et al. . |
| 5,027,478 | 7/1991 | Suhr ........................................... 24/16 |
| 5,615,903 | 4/1997 | Spear et al. ........................... 280/47.19 |
| 5,687,979 | 11/1997 | Plevka .................................... 280/47.19 |
| 5,836,055 | 11/1998 | Cooper ....................................... 24/339 |

FOREIGN PATENT DOCUMENTS

| | | |
|---|---|---|
| 630325 | 10/1992 | Australia . |
| 180884 | 5/1986 | Germany . |

OTHER PUBLICATIONS

French Search Report Dated Feb. 26, 1997.

*Primary Examiner*—Stephen P. Garbe
*Assistant Examiner*—Maerena W. Brevard
*Attorney, Agent, or Firm*—Young & Basile, P.C

[57] ABSTRACT

A tool holding device designed to be attached to a wheelbarrow contains at least two identical supports attachable to side of a body of a wheelbarrow, each of the supports containing at least one retaining cavity in the form of a U, with interior dimensions larger than the width of the handle of a tool to be held, and which opening is of a width less than the diameter of the handle so that the introduction of the handle into the cavity is achieved by forcing the distortion of a part of the support at the level of the opening, the bottom of the cavity containing an elastic member for repelling the handle towards the opening.

20 Claims, 4 Drawing Sheets

TOOL HOLDING DEVICE DESIGNED TO BE ATTACHED TO A WHEELBARROW

BACKGROUND OF THE INVENTION

A wheelbarrow is generally used to transport materials in bulk, which also necessitates the use of tools, such as a shovel, a rake, etc. In addition it is not always easy to move the wheelbarrow over a certain distance and carry several tools at the same time. In effect, the useful part, i.e., the heavier side of the tool rests in the body of the wheelbarrow, while the handle rests on the edge of the wheelbarrow; but the movements of balancing and jolting the wheelbarrow, above all when the ground is uneven, can lead to dropping the tools.

The goal of the present invention is to remedy this inconvenience by proposing a tool holding device attachable to a wheelbarrow which allows the movement of the wheelbarrow and at least one tool without the risk of dropping the tool.

SUMMARY OF THE INVENTION

The device of the present invention is characterized by at least two identical supports attachable to the side of the body of the wheelbarrow, each of the said supports containing at least one retaining cavity in the shape of a U such that the interior dimensions are greater than the width of the handle of the tool to be held, which opening is of a size smaller than the diameter of the handle so that the introduction of the handle into the cavity is achieved by forcing the distortion of a part of the support at the level of the opening. The bottom of the cavity contains an elastic means for repelling the handle towards the opening.

According to a first method of production of the device of this invention, the supports are constructed of a semi-rigid plastic material. According to a second method of production of the device of the invention, the supports are constructed of a pliable metal wire. According to an additional characteristic of the device of the invention, each support consists of several cavities, each one able to have different interior dimensions.

Conforming to the invention, a support is attachable to the body of the wheelbarrow either by magnetism, or by a clickable device on the edge of the body. The supports are attached onto a side of the wheelbarrow by an appropriate means, either by a clicking mechanism onto foundations permanently fixed onto the wheelbarrow, or by means of clamps, or by magnetism when the supports are made of a plastic material.

The elastic means for repelling consist of either a thin plate of metal attachable to the support onto the edge of the cavity arranged crosswise and in an inclined manner, or of a flat part, inclined, and made of the same material of which the support is made, and made with the production of the support.

BRIEF DESCRIPTION OF THE DRAWING

The advantages and the characteristics of this invention will become more clear in the invention which follows and which correlates to the attached drawing, which represents several methods of production which are non-limiting.

DESCRIPTION OF THE PREFERRED EMBODIMENTS

Figure 1:
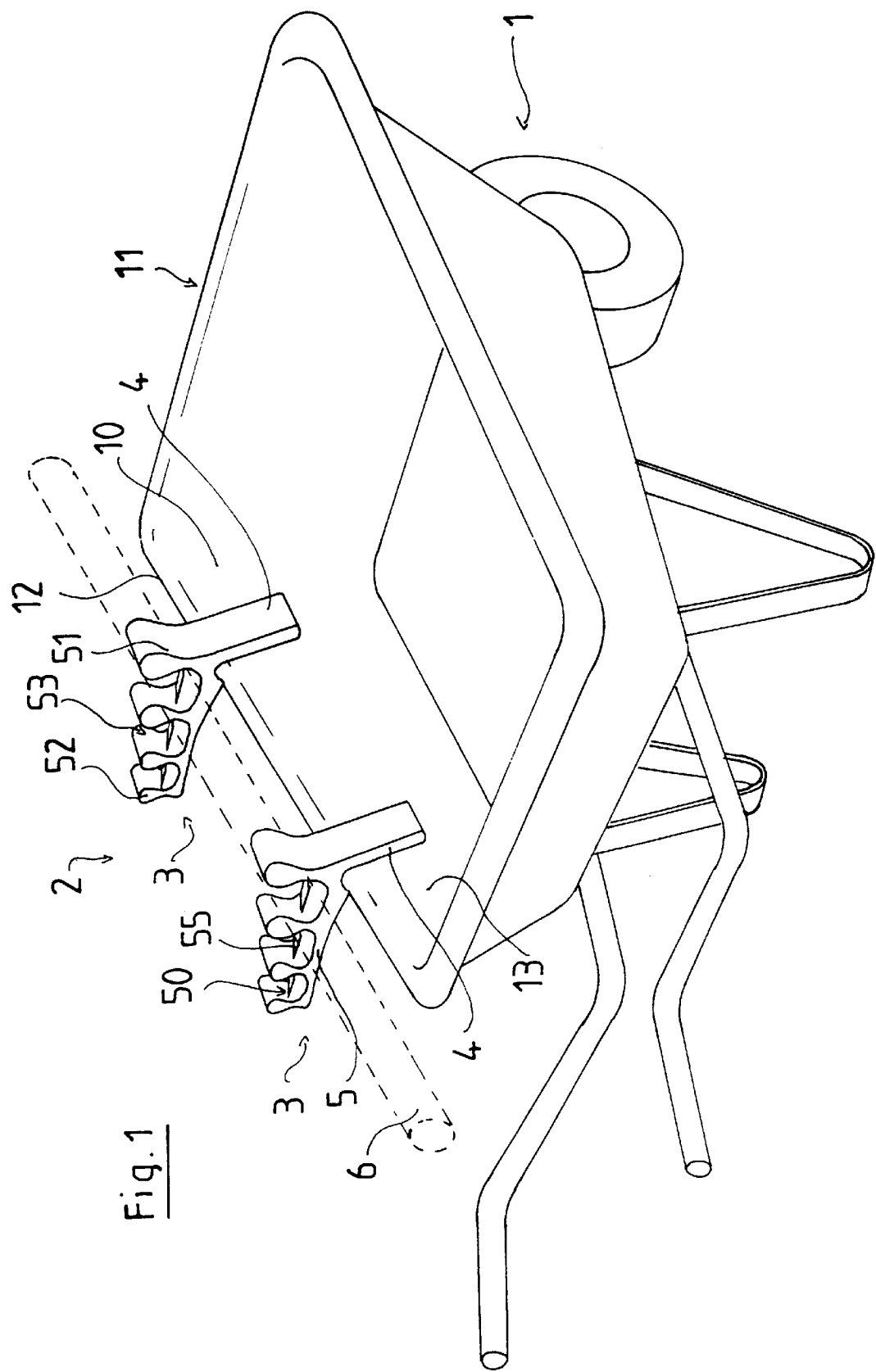
FIG. 1 represents a perspective view of a wheelbarrow equipped with a tool holding device as specified in the inventor.

If one refers to FIG. 1 one can see a wheelbarrow 1, on side 10 of body 11 of which is attached a tool holding device 2 according to the invention which contains two identical supports 3 each of which contains a lower part 4 designed to be attached to the body 1, and an upper part 5 projecting laterally from the body 11 and designed to hold tools.

Figure 2:
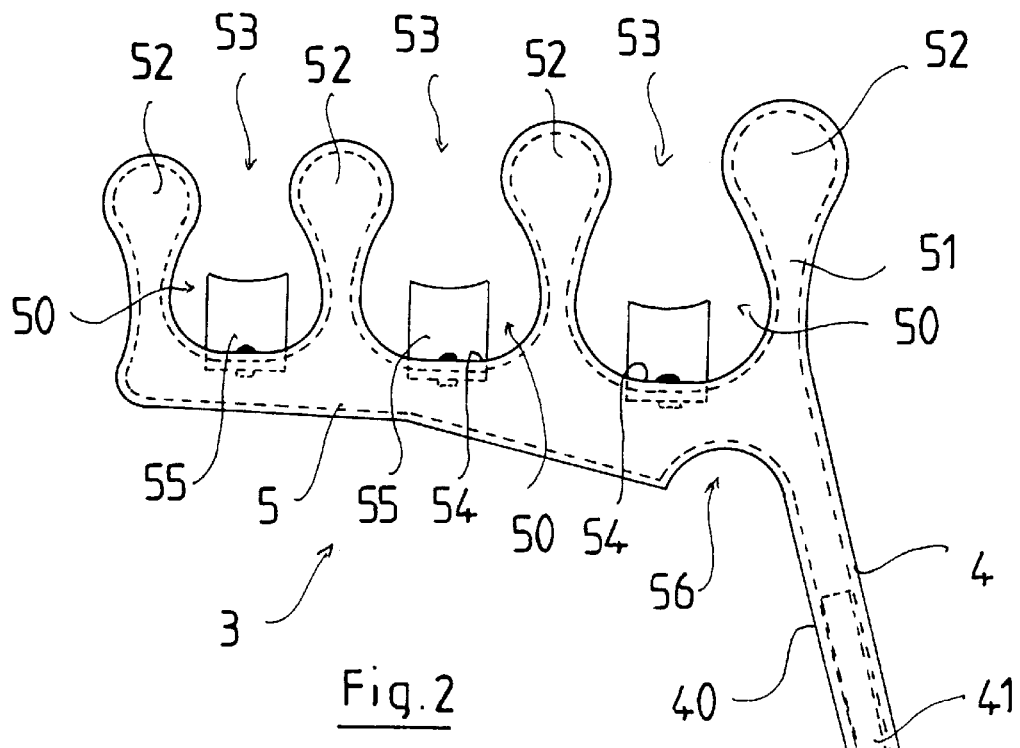
FIG. 2 represents an end elevation of the same device.

If one also refers to FIG. 2 one can see that in the upper part 5 of a support 3, which is created by thermoforming a plastic material, are pierced three cavities 50 in the form of a U, created by four vertical projections 51 of which each of the ends consists of a bulge 52 reducing the opening 53 of the cavities 50.

The cavities 50 are designed to each receive the handle 6 of a tool, represented by dotted lines on FIG. 1 introduced by forcing the spread of the ends of the vertical projections 51. The handle 6 rests on the two supports 3.

The bottom 54 of each of the cavities 50 contains an elastic element 55 for repelling the handle 6 towards the bulges 52 in order to block the handle 6. In this case the elastic means or element 55 are strips of metals attached to the support 3 by screws, and arranged crosswise and in an inclined manner.

The lower part 4 of each support 3 consists of a flat plane 40 continuing to a hollow 56 pierced in the upper part 5 and designed to tighten itself on the edge 12 of the side 10 of the body 11 of the wheelbarrow 1, while the flat plane 40 is pushed against the interior wall 13 of the side 10, the attachment of the support 3 to this embodiment being achieved by means of a magnetic element 41 which is contained in the lower part 4.

In practice, the handle 6 of the tool to be held is put into the two supports 3 in two parallel cavities 50 and is clicked into place by force, the elastic element 55 pinning the handle 6 against the bulges 52.

It is notable that little tools, like a trowel, can be attached to only one support 3. The cavities 50 are of different dimensions in order to allow the holding of all existing tools.

Figure 3:
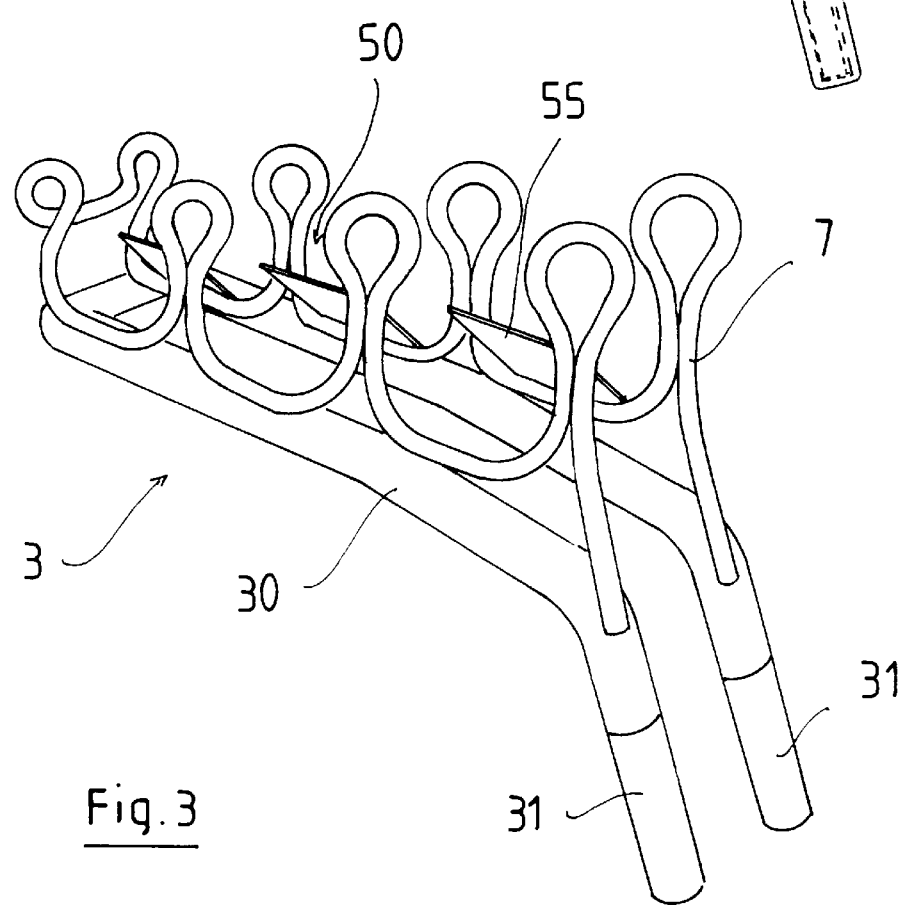
FIG. 3 represents a perspective view of a second method of production of the device of the invention.

If one now refers to FIG. 3 one can see that, according to a second method of production, the cavities 50 are created by bending a metallic wire 7, welded onto a bent tube 30, of which the ends 31 are designed to be introduced into tubes, not represented, of largest diameter attached to the body 11 of the wheelbarrow 1.

Figure 4:
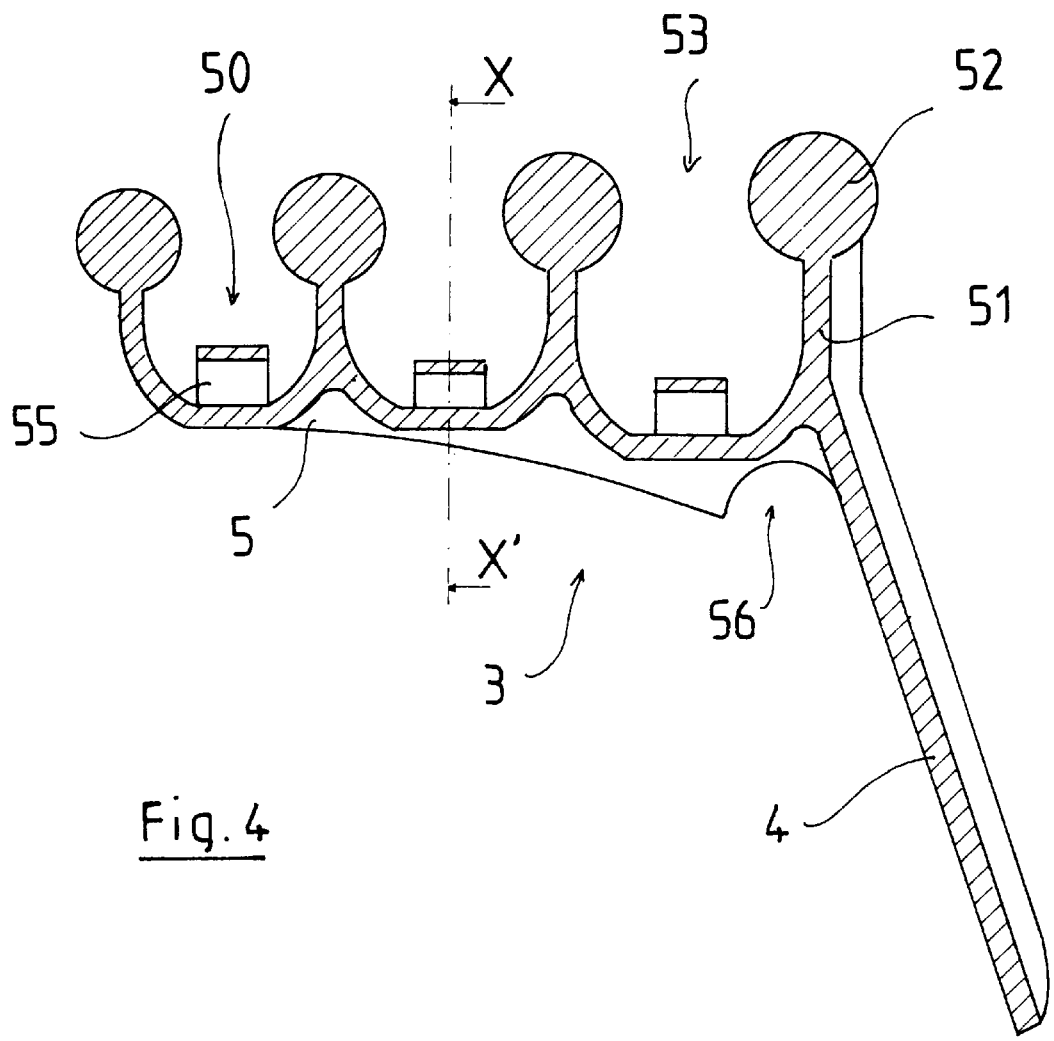
FIG. 4 represents a lengthwise cut view of a third method of production of the device of the invention.
Figure 5:
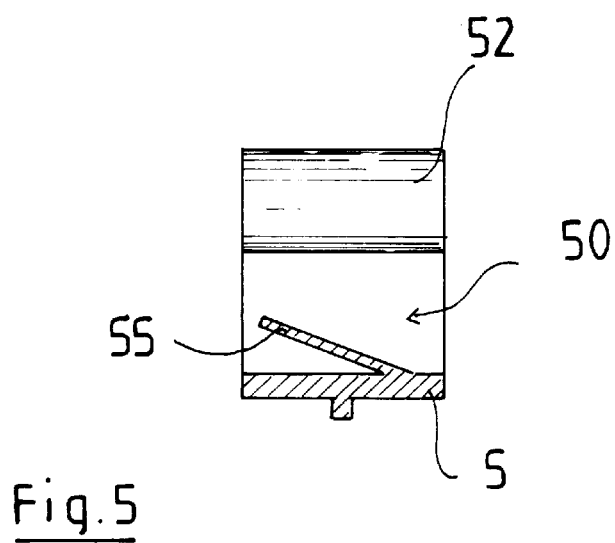
FIG. 5 represents a cross cut view along the axis XX' of FIG. 4.

If one refers now to FIGS. 4 and 5, one can see that according to a third method of production, the support 3 is achieved by molding a plastic material, the elastic means 55 for repelling coming from the molding, and the attachment to the body 11 of the wheelbarrow 1 being achieved by means of a magnet, not represented.

Figure 6:
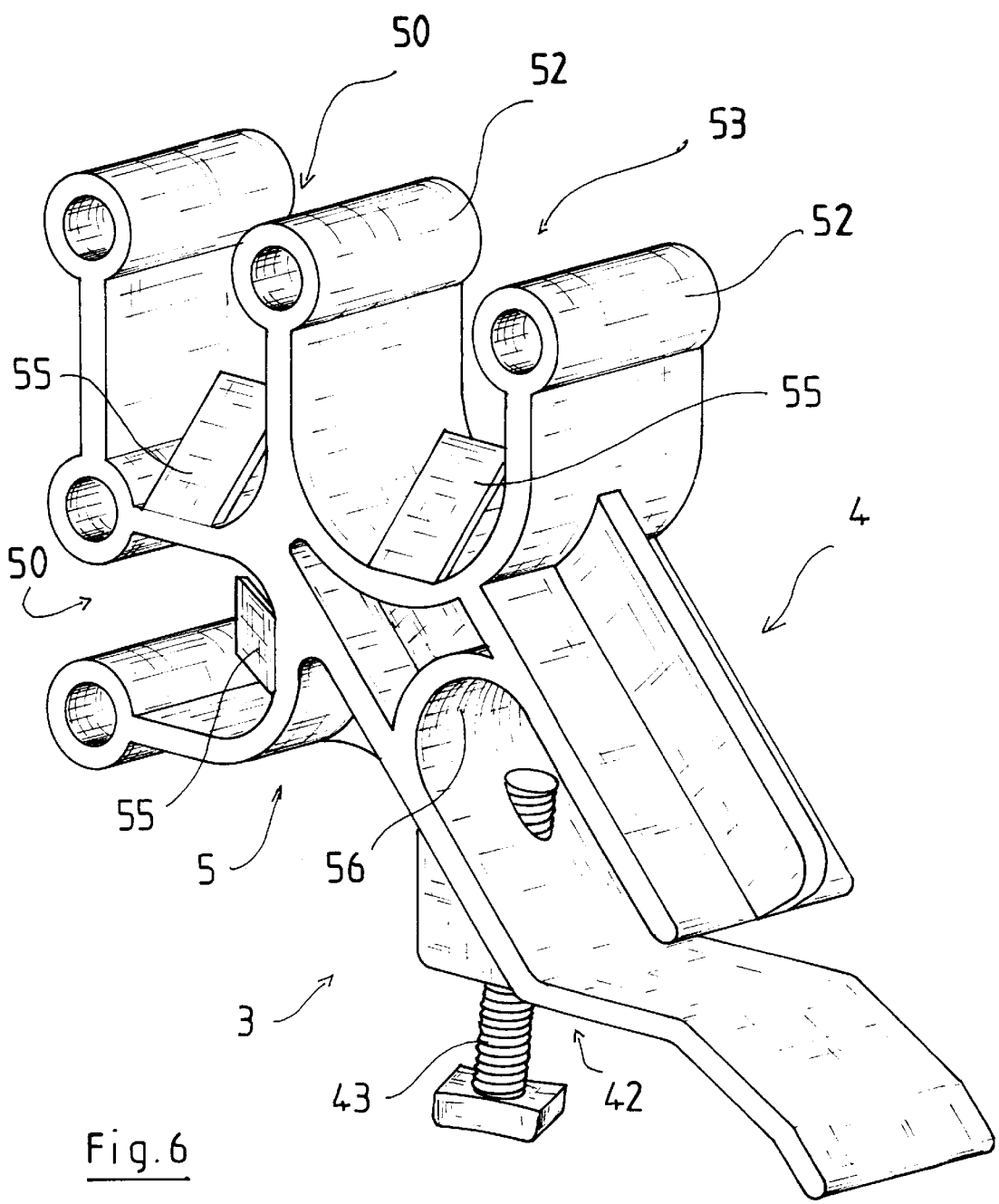
FIG. 6 represents a perspective view of a variance of the same device.

If one now refers to FIG. 6 one can see that according to a variant, the support 3 also being produced by the molding of a plastic material, but the cavities 50 are distributed differently, that is to say, two upper openings and one lateral opening. This variance allows notably the limiting of the width of the support 3 and therefore reduces its obstruction and its being unbalanced.

One can also see that the lower part 4 presents itself in the form of clamps 42 designed to fit tightly around the side 10 of the body 11 of the wheelbarrow 1, not represented, while the edge 12 of the body 11 can come to rest against the hollow 56 making up the bottom of the clamp 42, where it is blocked by a screw 43 screwed against the lower part of the edge 12.

I claim:

1. A tool holding device attachable on a wheelbarrow having a body with a side ending in an edge, comprising at least two identical supports attachable on the side of the body of a wheelbarrow, each of the supports containing at least one retaining U-shaped cavity, with interior dimensions larger than a width of a handle of a tool to be held, and of which an opening is of a width smaller than the diameter of the handle, such that the introduction of the handle in the cavity is achieved by forcing the deformation of a part of the support to the width of the opening, the bottom of the cavity containing an elastic means for repelling the handle towards the opening.

2. The device according to claim 1 characterized by each support containing at least two cavities.

3. The device according to claim 1 characterized by the supports being constructed of a thermoformed plastic material.

4. The device according to claim 1 characterized by the supports constructed by bending a metal wire.

5. The device according to claim 1 characterized by the elastic means for repelling comprising a strip of metal attached to the support in the bottom of the cavity, positioned crosswise and in an inclined manner.

6. The device according to claim 1 characterized by the supports being constructed by molding of a plastic material.

7. The device according to claim 6 characterized by the elastic means for repelling being an inclined flat part molded to the support.

8. The device according to claim 1 characterized by the attachment of at least one support on an edge of the body of a wheelbarrow being achieved by a magnetic element.

9. The device according to claim 1 characterized by the support comprising a lower part attachable to the body of the wheelbarrow, a part in the shape of a clamp able to squeeze the side of the body, while the bottom of the body is supported in the bottom of the part where it is blocked by a fastener engaged against the lower part of the side of a wheelbarrow.

10. A tool holding device attachable on a wheelbarrow having a body with a side ending in an edge, the device comprising:

at least one support attachable to a side of a body of a wheelbarrow, the support having at least one U-shaped retaining cavity with interior dimensions larger than a width of a tool to be held therein, and an opening at one end with a width smaller than a diameter of a handle of a tool to be held therein such that introduction of a handle of a tool into the cavity causes deformation of outer ends of the support to a width of the opening to allow passage of a handle of a tool therethrough;

elastic means for urging a handle disposed within the cavity toward the opening of the cavity; and means for attaching the support to a side of a body of a wheelbarrow.

11. The device of claim 10 further comprising at least two identical supports spaceably mounted on a side of a body of a wheelbarrow.

12. The device of claim 10 wherein the support includes at least two cavities.

13. The device of claim 12 wherein at least two cavities are disposed side-by-side on the support.

14. The device of claim 12 wherein at least two cavities are juxtaposed with respect to each other.

15. The device of claim 10 wherein the attaching means is integrally carried on the support.

16. The device of claim 15 wherein the attaching means comprises:

clamp means, carried on a lower part of the support and squeezably engageable with a side of a body of a wheelbarrow.

17. A tool holding device to be attached onto a wheelbarrow having a body with a side ending in an edge, comprising:

at least two identical supports attachable on the side of the body of a wheelbarrow, each of the supports containing at least one tool-handle-retaining cavity, each cavity with interior dimensions larger than a width of a handle of a tool to be held, and with an opening of a width smaller than the diameter of the handle, such that the introduction of the handle in the cavity is achieved by forcing deformation of a part of the support to a sufficient width of opening to allow entry of the handle of the tool therein, a bottom of each cavity containing a biasing member for urging the handle of the tool towards the opening.

18. The device of claim 17 further comprising each support containing at least two tool-handle-retaining cavities.

19. The device of claim 17 further comprising the supports being constructed of an elastic, deformable material selected from the group consisting of a thermoformed plastic material, a bent metal wire, and a molded plastic material.

20. The device of claim 17 further comprising the attachment of at least one support on an edge of the body of the wheelbarrow being achieved by a releasable attachment member selected from a group consisting of a magnetic element, and a clamp able to attach to the side of the body.

* * * * *